US007944659B2

(12) United States Patent
Marholev

(10) Patent No.: US 7,944,659 B2
(45) Date of Patent: *May 17, 2011

(54) ESD PROTECTION CIRCUIT FOR HIGH SPEED SIGNALING INCLUDING A SWITCH

(75) Inventor: Bojko Frederik Marholev, Bjarred (SE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,453

(22) Filed: Sep. 28, 2009

(65) Prior Publication Data

US 2010/0014200 A1 Jan. 21, 2010

Related U.S. Application Data

(63) Continuation of application No. 10/460,570, filed on Jun. 12, 2003, now Pat. No. 7,616,414.

(60) Provisional application No. 60/465,427, filed on Apr. 25, 2003.

(51) Int. Cl.

| | |
|---|---|
| ***H02H 9/00*** | (2006.01) |
| *H01C 7/12* | (2006.01) |
| *H02H 1/00* | (2006.01) |
| *H02H 1/04* | (2006.01) |

(52) U.S. Cl. ........................................ 361/56; 361/118

(58) Field of Classification Search .................... 361/56

See application file for complete search history.

(56) References Cited

U.S. PATENT DOCUMENTS

| | | | | |
|---|---|---|---|---|
| 5,719,737 | A * | 2/1998 | Maloney | 361/111 |
| 5,808,342 | A * | 9/1998 | Chen et al. | 257/357 |
| 6,275,089 | B1 * | 8/2001 | Song et al. | 327/314 |
| 7,616,414 | B2 * | 11/2009 | Marholev | 361/56 |

* cited by examiner

*Primary Examiner* — Dharti H Patel

(74) *Attorney, Agent, or Firm* — Garlick Harrison & Markison; Bruce E. Stuckman

(57) ABSTRACT

An ESD protection circuit for a switch coupled to high-speed signaling pins of an integrated circuit includes a first string of clamping elements and a second string of clamping elements. The first string of clamping elements has a collective capacitance less than the capacitance of a single clamping element. The first string of clamping elements is operably coupled to the drain and source of the transistor and conducts when a first polarity ESD voltage is applied to the high-speed pins. The second string of clamping elements has a collective capacitance less than the capacitance of one clamping element. The second string of clamping elements is operably coupled to the drain and source of the transistor and conducts when a second polarity ESD voltage is applied to the high speed signaling pins.

18 Claims, 5 Drawing Sheets

T/R switch module 73

T/R switch module 73

T/R switch module 73

ESD PROTECTION CIRCUIT FOR HIGH SPEED SIGNALING INCLUDING A SWITCH

CROSS REFERENCE TO RELATED APPLICATIONS

The present application claims priority under 35 USC 120 as a continuation of the copending application entitled, ESD PROTECTION CIRCUIT FOR HIGH SPEED SIGNALING INCLUDING T/R SWITCHES, filed on Jun. 12, 2003 having a Ser. No. 10/460,570, and which claims priority to U.S. Provisional Patent Application Ser. No. 60/465,427, filed Apr. 25, 2003, both of which are incorporated herein by reference for all purposes.

BACKGROUND OF THE INVENTION

1. Technical Field of the Invention

This invention relates generally to wireless communications systems and more particularly to wireless communication devices.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

Even though wireless communication devices include a transmitter and receiver, they generally communicate in a half duplex manner, i.e. they are either transmitting or receiving. As such, a wireless communication device may include a single antenna structure, which may include one antenna or a diversity antenna structure that is shared by the receiver and the transmitter of the device. To facilitate the sharing of the antenna structure, the wireless communication device includes at least one transmit/receive (T/R) switch.

In general the T/R switch couples either the receiver path or the transmitter path of the wireless communication device to the antenna structure. Since the T/R switch is coupling radio frequency (RF) signals in the megahertz to gigahertz range, the T/R switch must have a stable frequency response over the frequency range of interest. As such, the T/R switch is generally an off chip device or is fabricated using gallium arsenide integrated circuit process. Neither implementation is ideal for a CMOS implemented radio frequency integrated circuit (RFIC).

Another issue with T/R switches is when used by a wireless communication device that employs a diversity antenna structure. As is known, a diversity antenna structure includes two or more antennas that are physically separated (e.g. by a quarter wave length, half wave length, or full wave length) but receive the same signal. The antenna that receives the signal with the largest signal strength is selected for use by the wireless communication device. For a two antenna diversity structure, the wireless communication device includes two transmit receive switches: one to select the transmit or receive path and the other to select the first or second antenna. In this instance, since the RF signals are traversing two T/R switches, the T/R switches need to be extra clean (i.e. have a flat frequency response over the frequency range of interest and induce very little noise) making it essential to use off chip T/R switches or gallium arsenide integrated circuit T/R switches in conjunction with a CMOS radio frequency integrated circuit, which dramatically adds to the cost of a radio frequency integrated circuit.

Therefore, a need exists for an on chip implementation of a transmit receive switch that provides clean RF switching for single or diversity antenna structures and provides electrostatic discharge (ESD) protection for such switches and components thereof with minimal loading on the switch and/or components thereof.

BRIEF SUMMARY OF THE INVENTION

The ESD circuit of the present invention substantially meets these needs and others. In one embodiment, an ESD protection circuit for a transistor having a drain and source coupled to high-speed signaling pins of an integrated circuit includes a first string of clamping elements and a second string of clamping elements. The first string of clamping elements has a collective capacitance less than the capacitance of a single clamping element. The first string of clamping elements is operably coupled to the drain and source of the transistor and conducts when a first polarity ESD voltage is applied to the high-speed pins. The second string of clamping elements has a collective capacitance less than the capacitance of one clamping element. The second string of clamping elements is operably coupled to the drain and source of the transistor and conducts when a second polarity ESD voltage is applied to the high speed signaling pins. As such, ESD protection is provided with minimal loading on the high speed pins of the integrated circuit.

In another embodiment, an ESD protection circuit for a transistor having a gate, a drain and a source coupled to high-speed circuit includes a first string of clamping elements and a second string of clamping elements. The first string of clamping elements, which may be diodes, transistors, etc., has a collective capacitance less than the capacitance of one clamping element. The first string of clamping elements is operably coupled to the drain of the transistor and the gate of the transistor and is active to turn the transistor on when a first polarity ESD voltage is applied to the high-speed signaling pins. The second string of clamping elements has a collective capacitance less than the capacitance of a single clamping element. The second string of clamping elements is operably coupled to the gate and the source of the transistor and activates the transistor when a second polarity ESD voltage is applied to the high speed signaling pins. With such a ESD protection circuit, the loading and the high-speed signaling pins of the integrated circuit is minimal and further utilizes the transistor to provide at least a portion of the ESD protection.

DETAILED DESCRIPTION OF THE INVENTION

Figure 1:
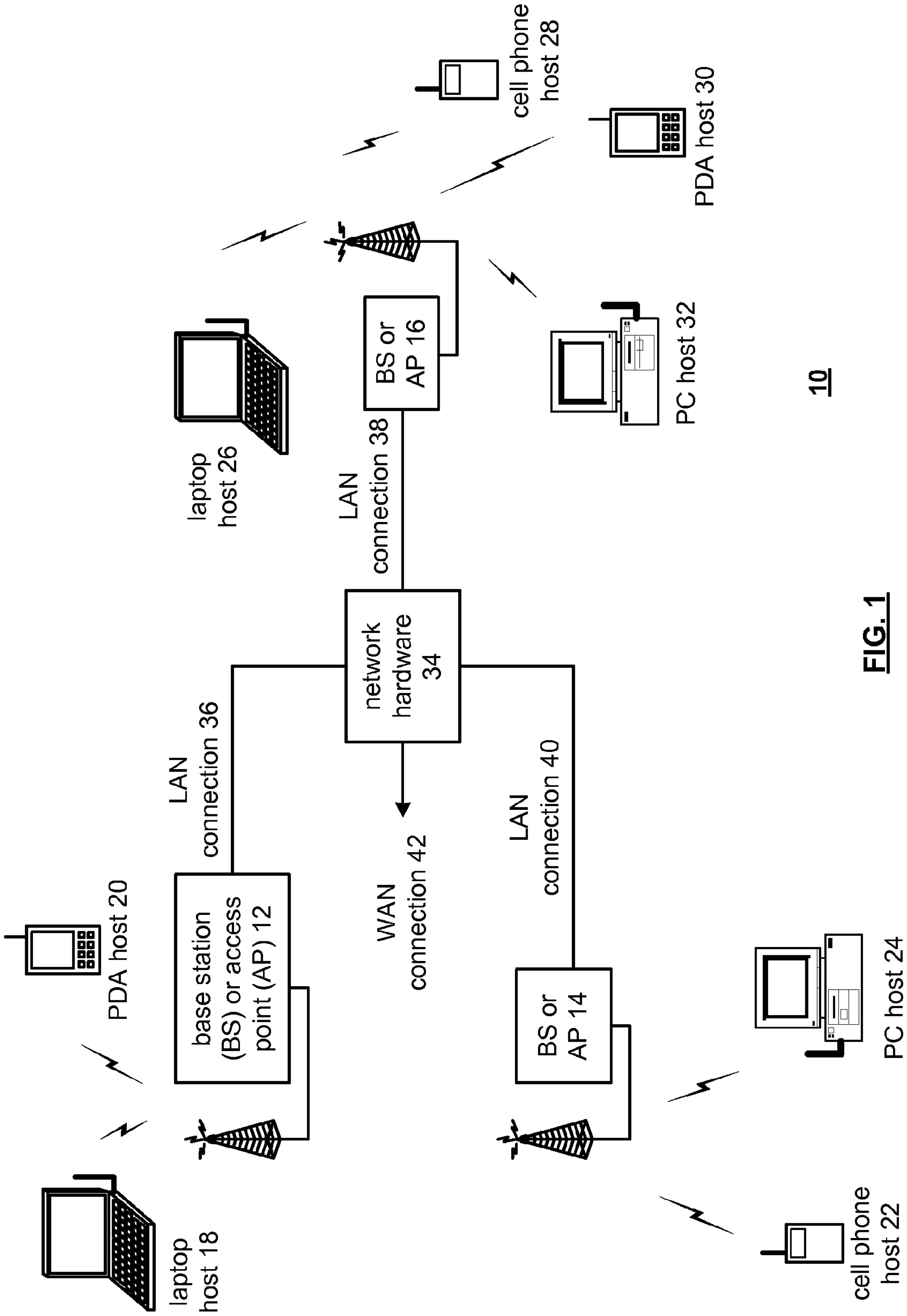
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
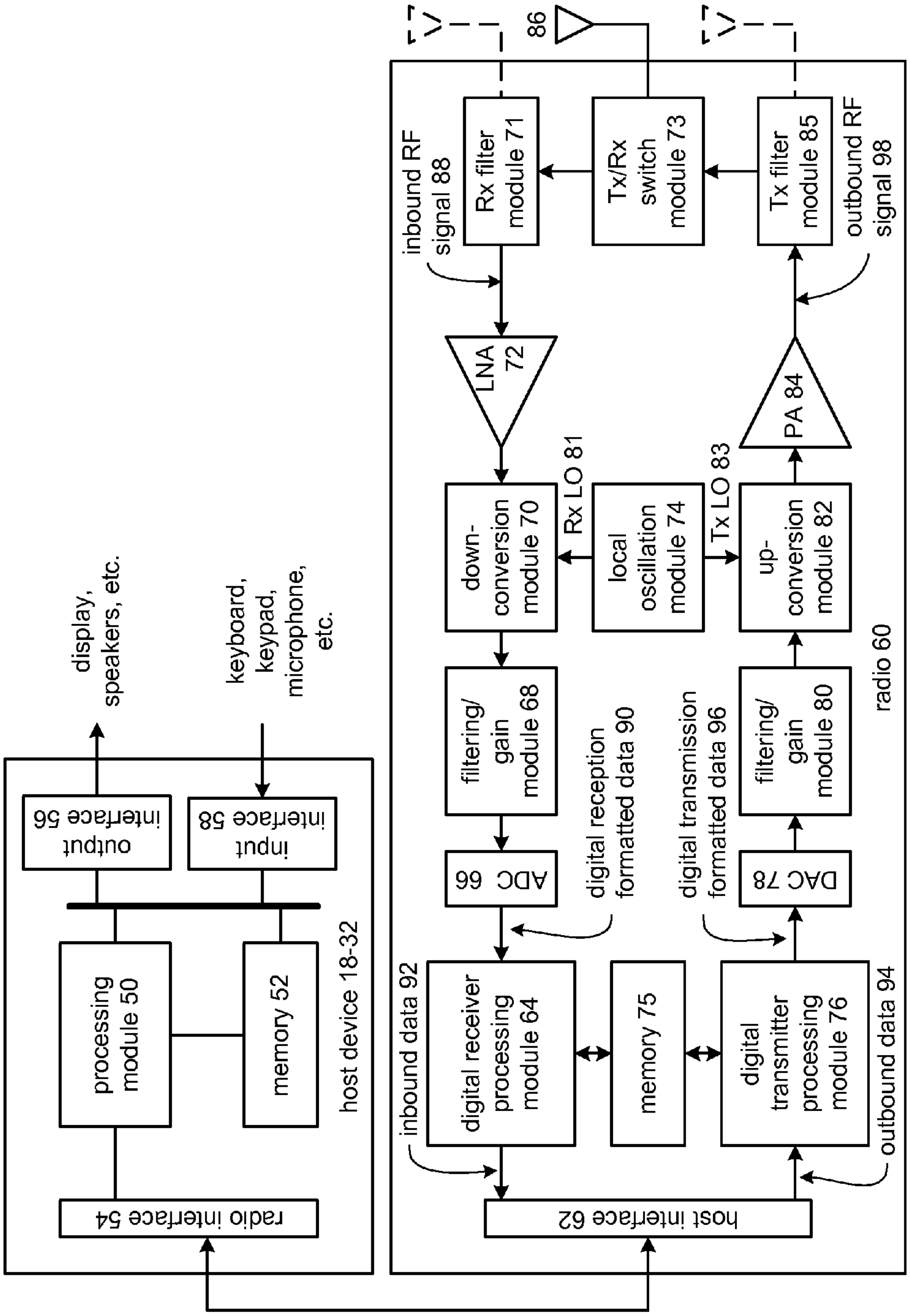
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74, which may be implemented in accordance with the teachings of the present invention. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74, which may be implemented in accordance with the teachings of the present invention. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
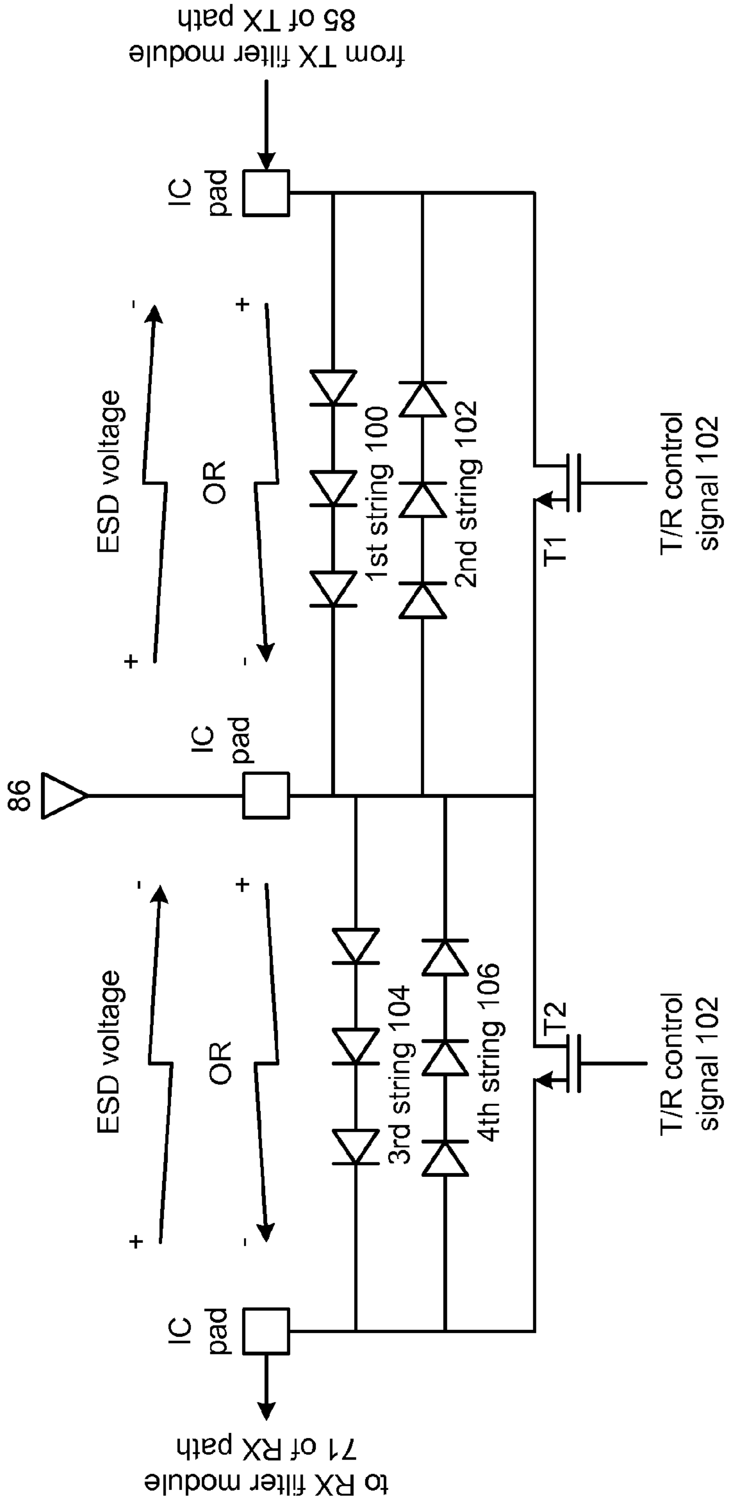
FIG. 3 illustrates a schematic block diagram of a T/R switch module including ESD protection in accordance with the present invention.

FIG. 3 illustrates a schematic block diagram of a transmit/receive switch module 73 that includes ESD protection circuitry. The transmit/receive switch module 73 includes transistors T1 and T2. As shown, the drain and source of transistors T1 and T2 are each coupled to integrated circuit paths. The common coupling of T1 and T2 is coupled to a single integrated circuit pad that is further coupled to antennae 86. Accordingly, in operation, when the T/R control signal 102 is in a first state, T1 is activated such that the transmit filter module 85 of the transmit path is coupled to antennae 86. When the T/R control signal 102 is in a second state, the receive filter module 71 of the receiver path is coupled to antennae 86.

To provide ESD protection for each transistor T1 and T2, four strings of clamping elements 104-110 are included. As shown, the each string of clamping elements 104-110 may include multiple clamping elements, such as diodes, transistors, etc., to conduct when an ESD voltage is present across the corresponding integrated circuit pads. In addition, by utilizing a string of clamping elements, the effective capacitance of the string is reduced in comparison to using a single clamping device. For example, if the desired clamping voltage is approximately 2 volts, three 0.7 volt diodes may be utilized. As one of average skill in the art will readily appreciate, the number of clamping elements in the string will depend on the desired clamping voltage and desired total capacitance. Further, by utilizing a string of clamping elements, the total capacitance is reduced in comparison to that of a single device such that the loading across the integrated circuit paths is substantially reduced. As such, for high frequency application, such as radio frequencies in the range of a few hundred megahertz to multiple gigahertz, the reduced loading effect of ESD circuitry is beneficial and enhances the overall performance during normal operating modes and yet provides the desired ESD protection during adverse ESD conditions.

As shown, T1 is protected by the first string 108 and second string 110. Accordingly when a first polarity of the ESD voltage is present, the first string 108 may conduct clamping the voltage across T1 to that of the voltage across the conducting first sting 108. Conversely, when a second polarity ESD voltage is present, the second string 110 conducts clamping the voltage across T1 to the cumulative forward biased voltage of the clamping elements in the second string 110. The third string 104 and fourth string 106 provide similar clamping for the second transistor T2. As one of average skill in the art will appreciate, the clamping elements in the strings of clamping elements 104-110 may include diodes, transistors and/or any other element that provides a clamping function.

Figure 4:
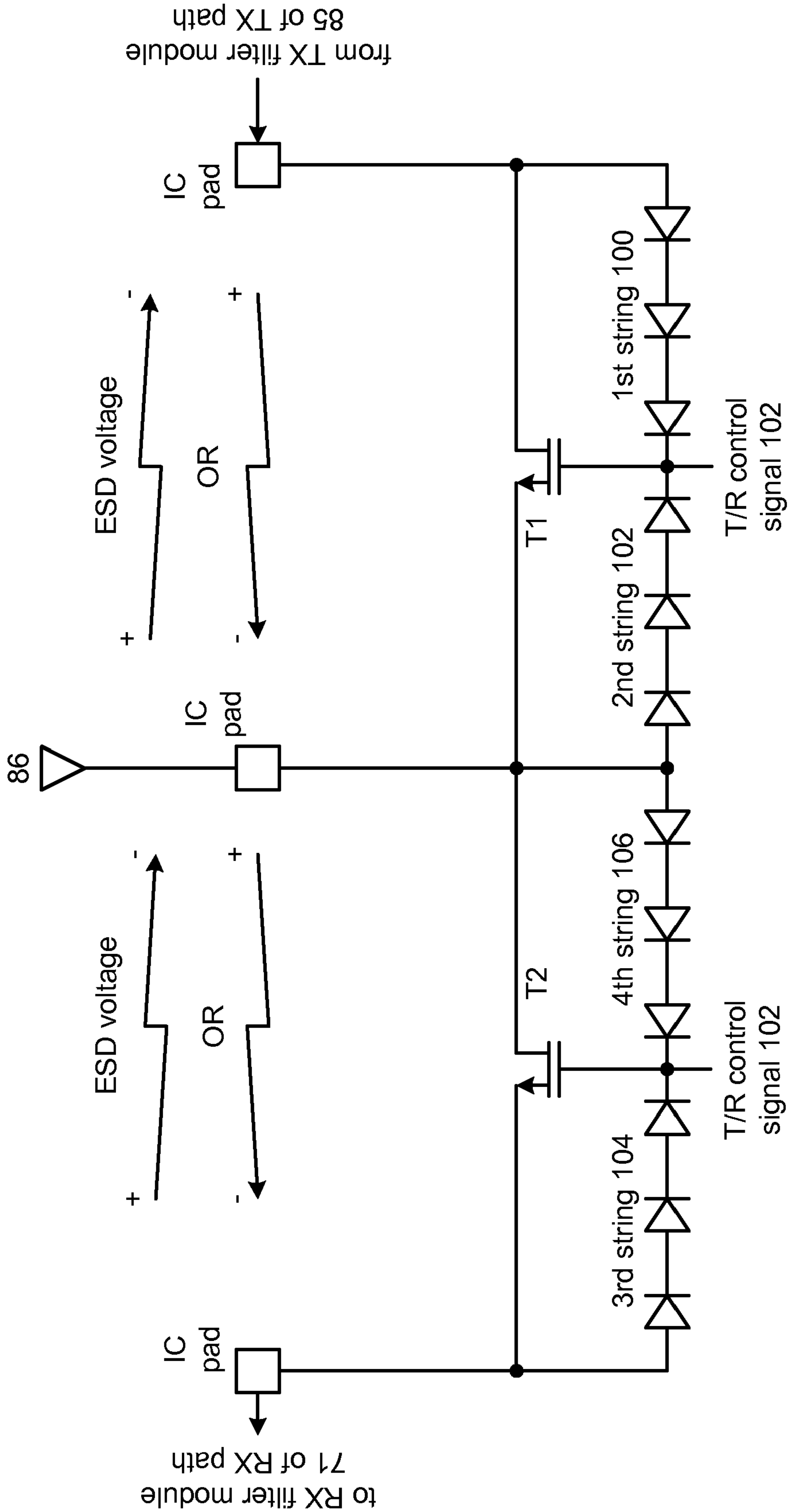
FIG. 4 illustrates a T/R switch including ESD protection in accordance with the present invention.

FIG. 4 is a schematic block diagram of the T/R switch module 73 with alternate ESD protection circuitry. In this illustration, the strings of clamping elements 104-110 are coupled between the drain and gate and the source and gate of the corresponding transistors. For instance, the first string of clamping elements 108 is coupled between the drain and gate of T1, the second string of clamping elements 110 is coupled between the source and gate of transistor T1, the third string of clamping elements 104 is coupled between the source and gate of T2, and the fourth string of clamping elements 106 is coupled between the drain and gate of transistor T2. In this instance, when a first polarity ESD voltage is present, the first string 108 is conductive thereby enabling transistor T1 to provide the corresponding clamping between the first and second integrated circuit paths. Conversely, when a second polarity ESD voltage is present the second string 110 is active to enable transistor T1 to again provide the clamping between the integrated circuit pads. The third and fourth strings 104 and 106 provide similar enablement and corresponding clamping of T2 when the first polarity or second polarity ESD event occurs.

Figure 5:
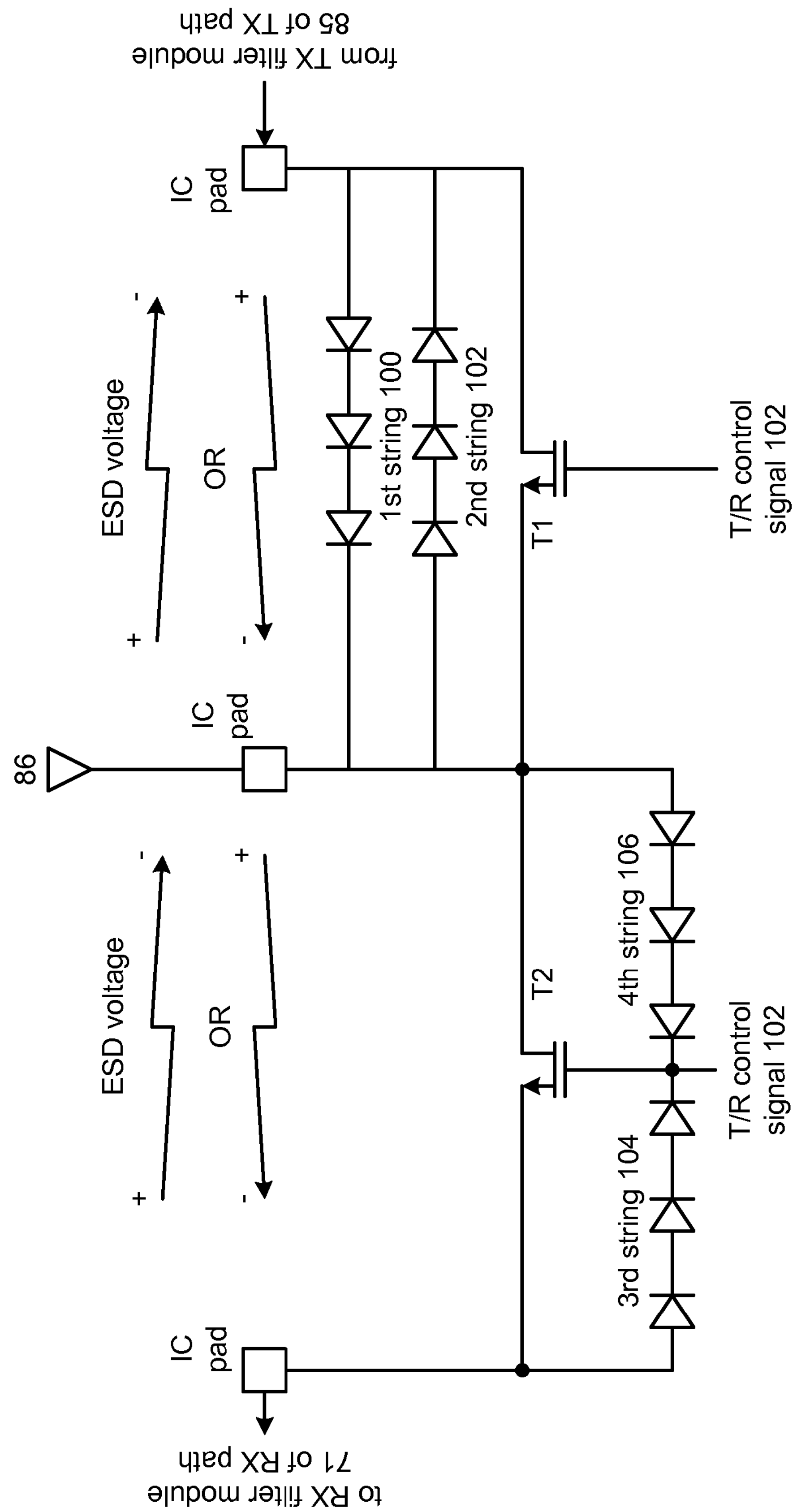
FIG. 5 is a schematic block diagram of a T/R switch including another ESD protection circuit in accordance with the present invention.

FIG. 5 illustrates the transmit/receive switch module 73 including a combination of the ESD protection illustrated in FIG. 3 and FIG. 4. As shown, the first and second strings 108 and 110 may provide clamping directly from the integrated circuit pads for transistor T1. As also shown, the third and fourth strings 104 and 106 may provide the ESD protection that utilizes the transistor T2 as part of the clamping circuit. As one of average skill in the art will appreciate, the alternate configuration may be implemented where the first and second strings utilize T1 to assist in the ESD protection and the third and fourth strings provide the clamping between the corresponding integrated circuit paths.

The preceding discussion has presented an ESD protection circuit for transistors that are coupled to high-speed signaling pins of an integrated circuit. Such an ESD protection circuit is particularly suited for an on chip transmit/receive switch that includes transistors. As one of average skill in the art will appreciate, other embodiments may be derived from the teaching of the present invention without deviating from the scope of the claims.

What is claimed is:

1. A switch operably coupled to a first signal port, a second signal port and a third signal port of an integrated circuit, the switch comprising:

a first switching element and a second switching element that cooperate to switch between a first state and a second state in response to at least one control signal, wherein the first signal port is coupled to the second signal port and decoupled from the third signal port in the first state, and the first signal port is decoupled from the second signal port and coupled to the third signal port in the second state;

a first string of clamping elements having a collective capacitance less than capacitance of one clamping element of the first string of clamping elements, wherein the first string of clamping elements is operably coupled to the first switching element and to conduct when a first polarity ESD voltage is applied to the high-speed signal pins;

a second string of clamping elements having a collective capacitance less than capacitance of one clamping element of the second string of clamping elements, wherein the second string of clamping elements is operably coupled to the first switching element and to conduct when a second polarity ESD voltage is applied to the high-speed signal pins;

a third string of clamping elements having a collective capacitance less than capacitance of one clamping element of the third string of clamping elements, wherein the third string of clamping elements is operably coupled to the second switching element and to conduct when the first polarity ESD voltage is applied to the high-speed signal pins; and a fourth string of clamping elements having a collective capacitance less than capacitance of one clamping element of the fourth string of clamping elements, wherein the fourth string of clamping elements is operably coupled to the second switching element and to conduct when the second polarity ESD voltage is applied to the high-speed signal pins.

2. The switch of claim 1, wherein each clamping element of the first, second, third, and fourth strings of clamping elements further comprises at least one of: a diode and a transistor.

3. The switch of claim 1, wherein at least one clamping element of the first string of clamping elements further comprises at least one of: a diode and a transistor.

4. The switch of claim 1, wherein at least one clamping element of the second string of clamping elements further comprises at least one of: a diode and a transistor.

5. The switch of claim 1, wherein at least one clamping element of the third string of clamping elements further comprises at least one of: a diode and a transistor.

6. The switch of claim 1, wherein at least one clamping element of the fourth string of clamping elements further comprises at least one of: a diode and a transistor.

7. A switch operably coupled to a first signal port, a second signal port and a third signal port of an integrated circuit, the switch comprises:

a first switching element and a second switching element that cooperate to switch between a first state and a second state in response to at least one control signal, wherein the first signal port is coupled to the second signal port and decoupled from the third signal port in the first state, and the first signal port is decoupled from the second signal port and coupled to the third signal port in the second state;

a first string of clamping elements having a collective capacitance less than capacitance of one clamping element of the first string of clamping elements, wherein the first string of clamping elements is operably coupled to activate the first switching element when a first polarity ESD voltage is applied to the high-speed signal pins;

a second string of clamping elements having a collective capacitance less than capacitance of one clamping element of the second string of clamping elements, wherein the second string of clamping elements is operably coupled to activate the first switching element when a second polarity ESD voltage is applied to the high-speed signal pins;

a third string of clamping elements having a collective capacitance less than capacitance of one clamping element of the third string of clamping elements, wherein the third string of clamping elements is operably coupled to activate the second switching element when the first polarity ESD voltage is applied to the high-speed signal pins; and a fourth string of clamping elements having a collective capacitance less than capacitance of one clamping element of the fourth string of clamping elements, wherein the fourth string of clamping elements is operably coupled to activate the second switching element when the second polarity ESD voltage is applied to the high-speed signal pins.

8. The switch of claim 7, wherein each clamping element of the first, second, third, and fourth strings of clamping elements further comprises at least one of: a diode and a transistor.

9. The switch of claim 7, wherein at least one clamping element of the first string of clamping elements further comprises at least one of: a diode and a transistor.

10. The switch of claim 7, wherein at least one clamping element of the second string of clamping elements further comprises at least one of: a diode and a transistor.

11. The switch of claim 7, wherein at least one clamping element of the third string of clamping elements further comprises at least one of: a diode and a transistor.

12. The switch of claim 7, wherein at least one clamping element of the fourth string of clamping elements further comprises at least one of: a diode and a transistor.

13. A switch operably coupled to high-speed signal pins of an integrated circuit, the switch comprises:

a first switching element and a second switching element that cooperate to switch between a first state and a second state in response to at least one control signal, wherein the first signal port is coupled to the second signal port and decoupled from the third signal port in the first state, and the first signal port is decoupled from the second signal port and coupled to the third signal port in the second state;

a first string of clamping elements having a collective capacitance less than capacitance of one clamping element of the first string of clamping elements, wherein the first string of clamping elements is operably coupled to the first switching element and to conduct when a first polarity ESD voltage is applied to the high-speed signal pins;

a second string of clamping elements having a collective capacitance less than capacitance of one clamping element of the second string of clamping elements, wherein the second string of clamping elements is operably coupled to the first switching element and to conduct when a second polarity ESD voltage is applied to the high-speed signal pins;

a third string of clamping elements having a collective capacitance less than capacitance of one clamping element of the third string of clamping elements, wherein the third string of clamping elements is operably coupled to activate the second switching element when the first polarity ESD voltage is applied to the high-speed signal pins; and a fourth string of clamping elements having a collective capacitance less than capacitance of one clamping element of the fourth string of clamping elements, wherein the fourth string of clamping elements is operably coupled to activate the second switching element when the second polarity ESD voltage is applied to the high-speed signal pins.

14. The switch of claim 13, wherein each clamping element of the first, second, third, and fourth strings of clamping elements further comprises at least one of: a diode and a transistor.

15. The switch of claim 13, wherein at least one clamping element of the first string of clamping elements further comprises at least one of: a diode and a transistor.

16. The switch of claim 13, wherein at least one clamping element of the second string of clamping elements further comprises at least one of: a diode and a transistor.

17. The switch of claim 13, wherein at least one clamping element of the third string of clamping elements further comprises at least one of: a diode and a transistor.

18. The switch of claim 13, wherein at least one clamping element of the fourth string of clamping elements further comprises at least one of: a diode and a transistor.

* * * * *